United States Patent
Kang et al.

(10) Patent No.: US 10,823,814 B2
(45) Date of Patent: Nov. 3, 2020

(54) SOUND DIRECTION DETECTION SENSOR INCLUDING MULTI-RESONATOR ARRAY

(71) Applicant: SAMSUNG ELECTRONICS CO., LTD., Suwon-si (KR)

(72) Inventors: Sungchan Kang, Hwaseong-si (KR); Cheheung Kim, Yongin-si (KR); Sangha Park, Seoul (KR); Yongseop Yoon, Seoul (KR); Choongho Rhee, Anyang-si (KR); Hyeokki Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 342 days.

(21) Appl. No.: 15/908,116

(22) Filed: Feb. 28, 2018

(65) Prior Publication Data
US 2019/0072635 A1   Mar. 7, 2019

(30) Foreign Application Priority Data
Sep. 1, 2017   (KR) .................. 10-2017-0111921

(51) Int. Cl.
*G01S 3/808*   (2006.01)
*G10K 11/178*   (2006.01)
(Continued)

(52) U.S. Cl.
CPC ............ *G01S 3/8086* (2013.01); *G01S 3/805* (2013.01); *G10K 11/1781* (2018.01); *G10K 11/36* (2013.01)

(58) Field of Classification Search
CPC ...... G01S 3/8086; G01S 3/805; G01S 3/8006; G10K 11/36; G10K 11/1781
See application file for complete search history.

(56) References Cited

U.S. PATENT DOCUMENTS 4,126,847 A * 11/1978 Etkins .................. G10K 11/205
181/175
5,856,722 A    1/1999 Haronian et al.
(Continued)

FOREIGN PATENT DOCUMENTS

CN      109425847 A *  3/2019  ............ G01S 3/805
EP      3451011 A1 *   3/2019  ......... G10K 11/1781
(Continued)

OTHER PUBLICATIONS

InvenSense "Microphone Array Beamforming", InevSense Inc., Application Note, Document AN-1140, Dec. 31, 2013 (12 pages total).
(Continued)

*Primary Examiner* — Daniel Pihulic
(74) *Attorney, Agent, or Firm* — Sughrue Mion, PLLC

(57) ABSTRACT

Provided is a sound direction detection sensor capable of detecting a direction from which sound is coming by using a multi-resonator array. The disclosed sound direction detection sensor includes two resonator arrays, each including a plurality of resonators having different resonance frequencies. The two resonator arrays have different directivities. Each resonator array serves as an audio sensor, and the sound direction detection sensor detects a direction from which sound is incident, regardless of a distance between audio sensors.

24 Claims, 13 Drawing Sheets

(51) Int. Cl.
*G10K 11/36* (2006.01)
*G01S 3/805* (2006.01)

(56) References Cited

U.S. PATENT DOCUMENTS

| | | |
|---|---|---|
| 6,901,802 B2 | 6/2005 | Datskos |
| 7,863,714 B2 | 1/2011 | Diamond et al. |
| 8,103,027 B2 | 1/2012 | Zhang et al. |
| 8,170,244 B2 | 5/2012 | Ryan et al. |
| 9,319,787 B1 | 4/2016 | Chu |
| 2009/0086577 A1 | 4/2009 | Ledeczi et al. |
| 2012/0026837 A1 | 2/2012 | Li et al. |
| 2012/0097636 A1 | 4/2012 | Bachman et al. |
| 2012/0328142 A1 | 12/2012 | Horibe et al. |
| 2016/0050506 A1 | 2/2016 | Kim |
| 2016/0071526 A1 | 3/2016 | Wingate et al. |
| 2018/0038901 A1 | 2/2018 | Kim et al. |
| 2018/0097506 A1 | 4/2018 | Kang et al. |
| 2018/0130485 A1 | 5/2018 | Park et al. |
| 2018/0131347 A1 | 5/2018 | Rhee et al. |
| 2018/0138886 A1 | 5/2018 | Yoon et al. |
| 2019/0072635 A1* | 3/2019 | Kang ............... G10K 11/36 |
| 2019/0348050 A1 | 11/2019 | Kim et al. |

FOREIGN PATENT DOCUMENTS

| | | | | |
|---|---|---|---|---|
| JP | 3353728 B2 | | 12/2002 | |
| JP | 2019045481 A | * | 3/2019 | ............ G10K 11/36 |
| KR | 10-1509342 B1 | | 4/2015 | |
| KR | 10-2018-0015482 A | | 2/2018 | |
| KR | 10-2018-0037841 A | | 4/2018 | |
| KR | 10-2018-0051189 A | | 5/2018 | |
| KR | 10-2018-0052038 A | | 5/2018 | |
| KR | 10-2018-0053031 A | | 5/2018 | |
| KR | 20190025359 A | * | 3/2019 | ......... G10K 11/1781 |
| WO | 2008010269 A1 | | 1/2008 | |
| WO | 2018124590 A1 | | 7/2018 | |

OTHER PUBLICATIONS

Daniel Wilmott et al. "Bio-Inspired Miniature Direction Finding Acoustic Sensor", Scientific Reports, Jul. 21, 2016 (pp. 1-8).

Xin Zhang et al. "Design of Small MEMS Microphone Array Systems for Direction Finding of Outdoors Moving Vehicles", Sensors, vol. 14, Mar. 5, 2014 (pp. 4384-4398).

Communication dated Oct. 18, 2018, issued by the European Patent Office in counterpart European Application No. 18163147.4.

* cited by examiner

SOUND DIRECTION DETECTION SENSOR INCLUDING MULTI-RESONATOR ARRAY

CROSS-REFERENCE TO RELATED APPLICATION

This application claims priority from Korean Patent Application No. 10-2017-0111921, filed on Sep. 1, 2017, in the Korean Intellectual Property Office, the disclosure of which is incorporated herein in its entirety by reference.

BACKGROUND

1. Field

Apparatuses consistent with exemplary embodiments relate to a sound direction detection sensor, and more particularly, to a sound direction detection sensor capable of detecting a direction from which sound is coming by using a multi-resonator array.

2. Description of the Related Art

There is an increasing use of sensors, installed in home appliances, image display devices, virtual reality devices, augmented reality devices, intelligent speakers, and the like, to detect a direction from which sound is coming and to recognize a voice. Such sensors typically calculate the direction from which the sound is coming from by using a time difference of the sound arriving at a plurality of omnidirectional acoustic sensors. When the plurality of omnidirectional acoustic sensors are used, they need to be separated from each other by a sufficient distance to detect the time difference. The angular resolution of the sound direction detection sensor is thus defined by the distances among the plurality of omnidirectional acoustic sensors and a sampling frequency, and may decrease as the distances and the sampling frequency increase.

SUMMARY

According to an aspect of an exemplary embodiment, a sound direction detection sensor includes a first resonator array including a plurality of resonators having different resonance frequencies and a second resonator array including a plurality of resonators having different resonance frequencies. The first resonator array and the second resonator array may have different directivities.

The first resonator array and the second resonator array may have the same frequency response characteristics.

For example, resonance frequencies of the plurality of resonators of the first resonator array and of the second resonator array may be within an audible frequency band.

For example, the first resonator array and the second resonator array may be disposed such that there is a difference of 90 degrees between the directivity of the first resonator array and the directivity of the second resonator array.

The sound direction detection sensor may further include a calculator configured to calculate a direction of sound based on outputs of the first resonator array and outputs of the second resonator array.

The calculator may be further configured to detect a direction of sound by comparing a first output obtained by the first resonator array with a second output obtained by the second resonator array.

The calculator may be further configured to obtain the first output and the second output by calculating an average of root-mean-squares of the plurality of resonators of the first resonator array and an average of root-mean-squares of the plurality of resonators of the second resonator array in a time domain.

The calculator may be further configured to detect a direction of sound by comparing an output obtained by at least one resonator selected from among the plurality of resonators of the first resonator array with an output obtained by at least one resonator selected from among the plurality of resonators of the second resonator array.

The calculator may be further configured to detect a direction of sound by comparing time domain data or frequency domain data derived from the outputs obtained by the at least one resonator of the plurality of resonators of the first resonator array and by the at least one resonator of the plurality of resonators of the second resonator array.

The sound direction detection sensor may further include a first substrate and a second substrate which are inclined with respect to each other, a first sound inlet comprising an opening through the first substrate, and a second sound inlet comprising an opening through the second substrate.

The first resonator array may be fixed on the first substrate and face the first sound inlet, the second resonator array may be fixed on the second substrate and face the second sound inlet, and the first resonator array and the second resonator array may be disposed in different directions.

Each of the plurality of resonators of the first resonator array may include a fixed portion fixed on the first substrate, a moveable portion configured to move in response to an audio signal, and a sensing portion configured to sense movement of the moveable portion, and each of the plurality of resonators of the second resonator array may include a fixed portion fixed on the second substrate, a moveable portion configured to move in response to an audio signal, and a sensing portion configured to sense movement of the moveable portion.

The moveable portions of the plurality of resonators of the first resonator array may be disposed to be exposed to incident sound through the first sound inlet, and the moveable portions of the plurality of resonators of the second resonator array may be disposed to be exposed to incident sound through the second sound inlet.

Fixed portions of the plurality of resonators of the first resonator array may be disposed along a side of the first sound inlet so as not to overlap one another, and fixed portions of the plurality of resonators of the second resonator array may be disposed along a side of the second sound inlet so as not to overlap one another.

A side of the first substrate and a side of the second substrate may be connected to each other and in contact with each other, and an angle between the first substrate and the second substrate may be 90 degrees.

The sound direction detection sensor may further include a third substrate including a third sound inlet, a fourth substrate including a fourth sound inlet, a third resonator array fixed on the third substrate and facing the third sound inlet, and a fourth resonator array fixed on the fourth substrate and facing the fourth sound inlet, in which the first substrate, the second substrate, the third substrate, and the fourth substrate are arranged to form a square, and the first resonator array, the second resonator array, the third resonator array, and the fourth resonator array are disposed in different directions.

The sound direction detection sensor may further include a third substrate including a third sound inlet, a fourth substrate including a fourth sound inlet, a fifth substrate including a fifth sound inlet, a sixth substrate including a sixth sound inlet, a third resonator array fixed on the third substrate and facing the third sound inlet, a fourth resonator array fixed on the fourth substrate and facing the fourth sound inlet, a fifth resonator array fixed on the fifth substrate and facing the fifth sound inlet, and a sixth resonator array fixed on the sixth substrate and facing the sixth sound inlet, in which the first substrate, the second substrate, the third substrate, the fourth substrate, the fifth substrate, and the sixth substrate are arranged to form a hexahedron, and the first resonator array, the second resonator array, the third resonator array, the fourth resonator array, the fifth resonator array, and the sixth resonator array are disposed in different directions.

According to an aspect of another exemplary embodiment, a sound direction detection sensor includes a first substrate, a first sound inlet and a second sound respectively comprising a first opening and a second opening through the first substrate, a second substrate disposed to face the first substrate and spaced apart from the first substrate, a sound outlet comprising an opening through the second substrate, a first resonator fixed on the first substrate and facing the first sound inlet, and a second resonator fixed on the first substrate and facing the second sound inlet.

The sound direction detection sensor may further include a spacer disposed between an edge of the first substrate and an edge of the second substrate to maintain the space between the first substrate and the second substrate.

The first sound inlet and the second sound inlet may be spaced apart from each other, the first sound inlet and the sound outlet may form an acoustic path in a first direction, and the second sound inlet and the sound outlet may form an acoustic path in a second direction, different from the first direction.

The first resonator and the second resonator may be substantially parallel to each other.

The first resonator may include a plurality of resonators having different resonance frequencies, and the second resonator may include a plurality of resonators having different resonance frequencies.

Each resonator among the plurality of resonators of the first resonator and the plurality of resonators of the second resonator may include a fixed portion fixed on the first substrate, a moveable portion configured to move in response to an audio signal, and a sensing portion configured to sense movement of the moveable portion.

The moveable portions of the plurality of resonators of the first resonator may be disposed to be exposed to incident sound through the first sound inlet, and the moveable portions of the plurality of resonators of the second resonator may be disposed to be exposed to incident sound through the second sound inlet.

The fixed portions of the plurality of resonators of the first resonator may be disposed along a side of the first sound inlet so as not to overlap one another, and the fixed portions of the plurality of resonators of the second resonator may be disposed along a side of the second sound inlet so as not to overlap one another.

BRIEF DESCRIPTION OF THE DRAWINGS

These and/or other exemplary aspects and advantages will become apparent and more readily appreciated from the following description of the exemplary embodiments, taken in conjunction with the accompanying drawings in which.

DETAILED DESCRIPTION

Figure 1:
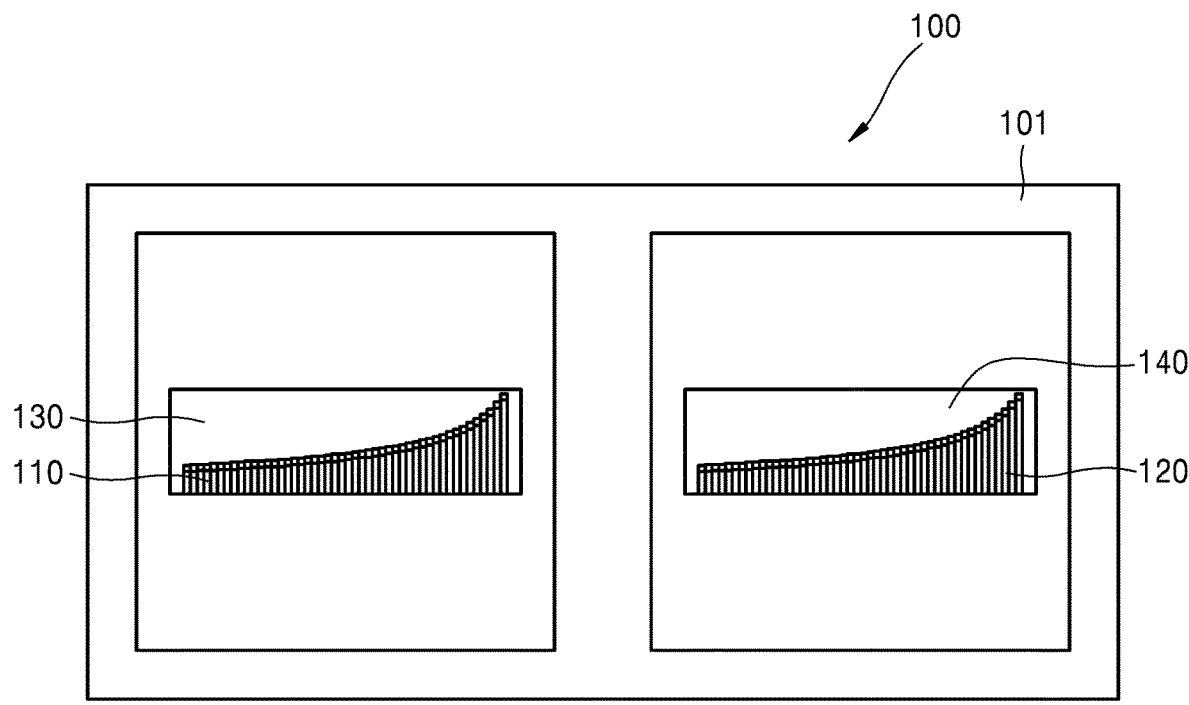
FIG. 1 is a schematic plan view showing a structure of a sound direction detection sensor according to an exemplary embodiment.

Reference will now be made in detail to exemplary embodiments which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. Expressions such as "at least one of," when preceding a list of elements, modify the entire list of elements and do not modify the individual elements of the list.

Hereinbelow, a sound direction detection sensor including a multi-resonator array or an array of a plurality of resonators will be described in detail with reference to the accompanying drawings. Throughout the drawings, like reference numerals refer to like elements, and each element may be exaggerated in size for clarity and convenience of a description. Meanwhile, the following embodiments are merely illustrative, and various modifications may be possible from the exemplary embodiments. In a layer structure described below, an expression such as "above" or "on" may include not only the meaning of "immediately on in a contact manner", but also the meaning of "on in a non-contact manner.

A sound direction detection sensor considered herein may be disposed to have different directivities having two or more resonant structures. Each resonant structure may include one resonator or a plurality of resonators. Although the following description and drawings show a resonant structure having a plurality of resonators, the resonant structure may be replaced with a resonant structure having only one resonator if the plurality of resonators are not desired. For example, in the following description, the sound direction detection sensor is described as using two resonator arrays, each of which includes a plurality of resonators, but this is merely an example, and only two resonators may be used in place of the two resonator arrays.

FIG. 1 is a schematic plan view showing a structure of a sound direction detection sensor according to an exemplary embodiment. Referring to FIG. 1, a sound direction detection sensor 100 according to an exemplary embodiment may include a first resonator array 110 including a plurality of resonators having different resonance frequencies and a second resonator array 120 including a plurality of resonators having different resonance frequencies. The resonators of the first resonator array 110 may be the same as the resonators of the second resonator array 120. In other words, the resonators of the first resonator array 110 may have the same frequency response characteristics as the resonators of the second resonator array 120. However, the present disclosure is not limited thereto, and the plurality of resonators of the first resonator array 110 and the plurality of resonators of the second resonator array 120 may have different frequency response characteristics.

The first resonator array 110 and the second resonator array 120 serve as sound sensors capable of sensing sound. To this end, resonance frequencies of the plurality of resonators of the first resonator array 110 and of the plurality of resonators of the second resonator array 120 may be within, for example, an audible frequency band. For example, the first resonator array 110 and the second resonator array 120 may each include 48 resonators having resonance frequencies increasing with an increment of 75 Hz, starting from 500 Hz. Some of the plurality of resonators of the first resonator array 110 and of the second resonator array 120 may have resonance frequencies lower or higher than audible frequencies.

The first resonator array 110 and the second resonator array 120 are disposed in adjacent to each other on a substantially planar upper substrate 101. For example, the first resonator array 110 and the second resonator array 120 may be disposed in parallel with each other. To allow sound waves to be incident on the first resonator array 110 and on the second resonator array 120, a first sound inlet 130 and a second sound inlet 140 are provided as openings in the upper substrate 101. The first sound inlet 130 and the second sound inlet 140 are disposed in a line and spaced apart from each other by an interval. The first resonator array 110 is disposed to face the first sound inlet 130 and is exposed to incident sound waves through the first sound inlet 130. The second resonator array 120 is disposed to face the second sound inlet 140 and is exposed to incident sound waves through the second sound inlet 140.

Figure 2:
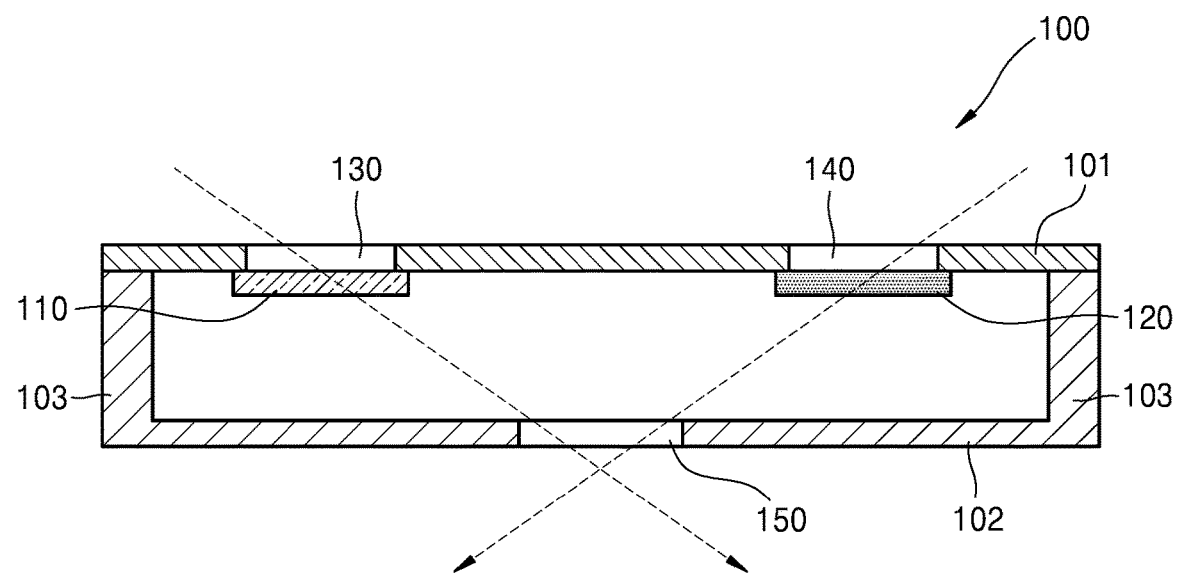
FIG. 2 is a schematic cross-sectional view of the sound direction detection sensor shown in FIG. 1.

FIG. 2 is a schematic cross-sectional view of the sound direction detection sensor 100 shown in FIG. 1. Referring to FIG. 2, the sound direction detection sensor 100 may further include a lower substrate 102, facing the upper substrate 101, and spaced therefrom, and a vertical spacer 103 disposed between edges of the upper substrate 101 and edges of the lower substrate 102 to maintain constant the spacing between the upper substrate 101 and the lower substrate 102. The lower substrate 102 is in the form of a substantially planar plate and may be parallel to the upper substrate 101, but the present disclosure is not limited to this structure. For example, the lower substrate 102 may alternately have a curved surface.

One sound outlet 150 is provided as an opening in the lower substrate 102. Sound entering the sensor 100 through the first sound inlet 130 and/or the second sound inlet 140 exits the sensor 100 through the sound outlet 150 in the lower portion of the sound direction detection sensor 100. Thus, an acoustic path having a first direction is formed by the first sound inlet 130 and the sound outlet 150, and an acoustic path having a second direction is formed by the second sound inlet 140 and the sound outlet 150. Since the first sound inlet 130 and the second sound inlet 140 are spaced apart from each other on the upper substrate 101, the first direction and the second direction are different from each other.

Figure 3A:
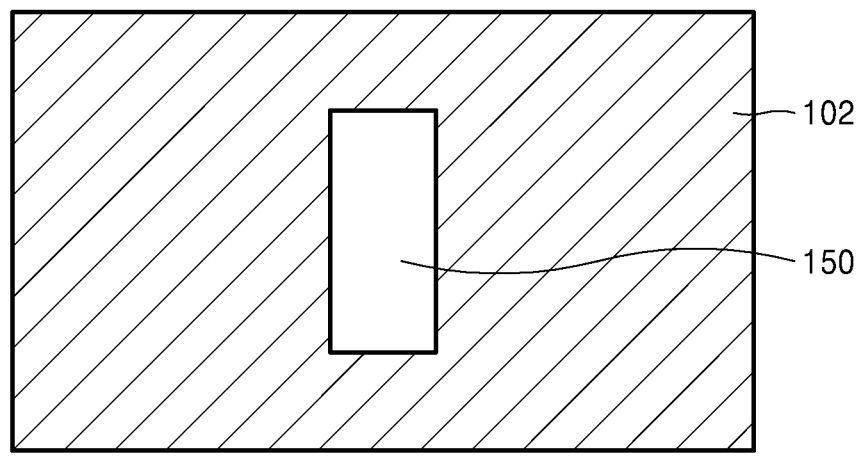
FIGS. 3A, 3B, and 3C are schematic rear views of a sound direction detection sensor according to various exemplary embodiments.
Figure 3B:
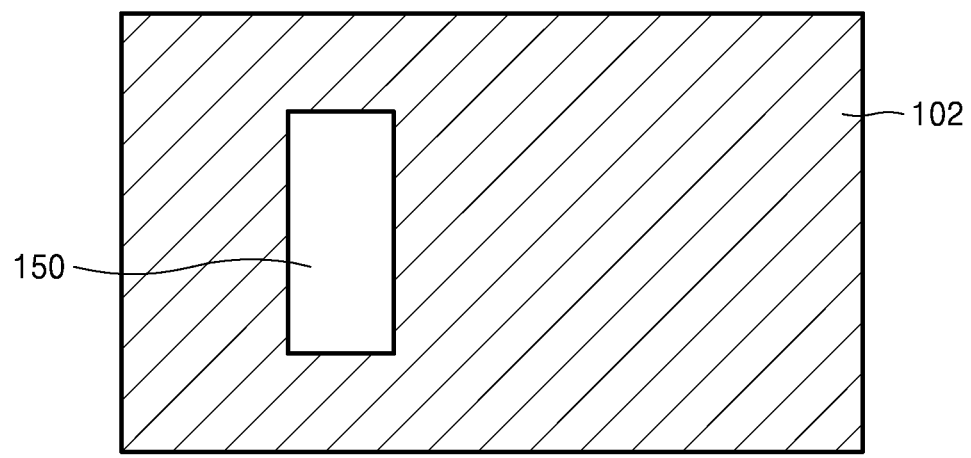
Figure 3C:
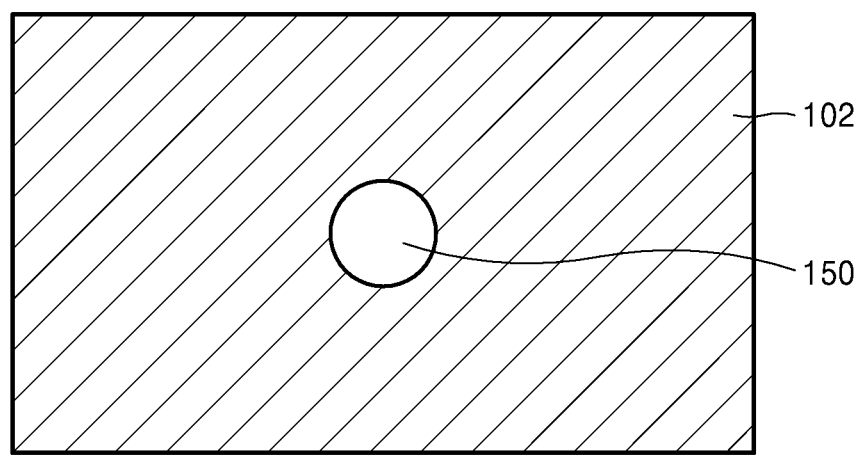

FIGS. 3A through 3C are schematic rear views of the sound direction detection sensor 100 according to various exemplary embodiments in which exemplary embodiments the sound outlet 150 are illustrated having various positions and forms. For example, referring to FIG. 3A, the sound outlet 150 may have a rectangular shape and may be formed in a central portion of the lower substrate 102. As shown in FIG. 3B, the sound outlet 150 may have a rectangular shape and may be disposed in a right side of the lower substrate 102. As shown in FIG. 3C, the sound outlet 150 may have a circular shape and may be formed in the central portion of the lower substrate 102. The sound outlet 150 may have any of various different shapes, sizes, and positions. The position of the sound outlet 150 may determine the first direction and the second direction, and the shape and size of the sound outlet 150 may influence characteristics of the sound direction detection sensor 100. Thus, the shape, size, and position of the sound outlet 150 may be properly determined depending on the desired use of the sound direction detection sensor 100.

Referring back to FIG. 2, the first resonator array 110 is fixed on a lower surface of the upper substrate 101 to face the first sound inlet 130, and the second resonator array 120 is fixed on the lower surface of the upper substrate 101 to face the second sound inlet 140. Thus, the first resonator array 110 responds to sound traveling in the first direction from the first sound inlet 130 to the sound outlet 150, and the second resonator array 120 responds to sound traveling in the second direction from the second sound inlet 140 to the sound outlet 150. To maintain a uniform accuracy for sound having any of various spectrums, the first resonator array 110 and the second resonator array 120 may each include a plurality of resonators having different resonance frequencies. In order for each resonator of the first resonator array 110 and each resonator of the second resonator array 120 to vibrate in response to sound having a corresponding frequency, one end of each resonator is fixed to the upper substrate 101 and an opposite end, exposed to incident sound waves through the first sound inlet 130 or the second sound inlet 140, is a free end.

Figure 4:
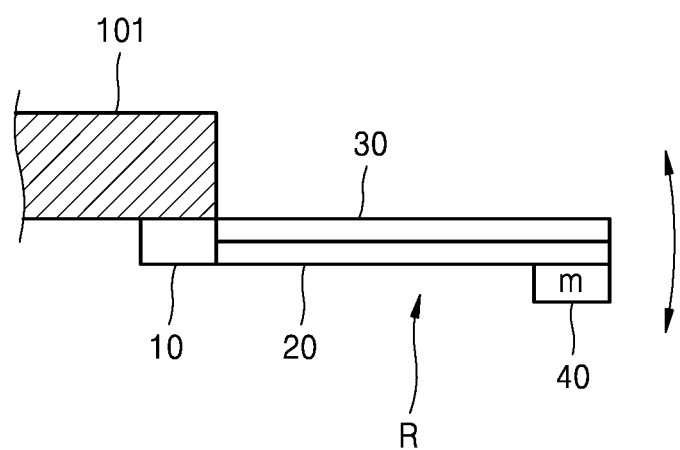
FIG. 4 is a schematic cross-sectional view of a structure of one resonator of the sound direction detection sensor shown in FIG. 1.

For example, FIG. 4 is a schematic cross-sectional view of a structure of one resonator of the sound direction detection sensor 100 shown in FIG. 1. Referring to FIG. 4, each of the resonators R of the sensor 100 may include a fixed portion 10 fixed to the upper substrate 101, a moveable portion 30 which moves in response to an acoustic signal, and a sensing portion 20, which senses movement of the moveable portion 30. The resonator R may further include a mass body 40 for providing additional mass m to the moveable portion 30.

The plurality of resonators R of the first resonator array 110 and of the second resonator array 120 may be arranged in a single plane without overlapping one another in such a way that each resonator R is exposed, at the same time, to an input path of an acoustic signal. For example, the fixed portions 10 of the plurality of resonators R of the first resonator array 110 may be arranged along a side of the first sound inlet 130, such that they do not overlap one another, and the fixed portions 10 of the plurality of resonators R of the second resonator array 120 may be arranged along a side of the second sound inlet 140, such that they do not overlap one another. The moveable portions 30 of the plurality of resonators R of the first resonator array 110 may be exposed to incident sound waves through the first sound inlet 130, and the moveable portions 30 of the plurality of resonators R of the second resonator array 120 may be exposed to incident sound waves through the second sound inlet 140.

The moveable portion 30 may include an elastic film for elastic vibration based on an acoustic signal (incident sound waves). For example, the elastic film may include a material such as silicon, metal, polymer, etc. A length of the elastic film and the mass m of the mass body 40 are factors that contribute to determining the resonant characteristics of the resonator R. The resonance frequency of the resonator R varies with the length of the elastic film. For example, a moveable portion 30 having a short length may vibrate in response to high-frequency sound and a moveable portion 30 having a long length may vibrate in response to low-frequency sound. Thus, the resonance frequency of the resonator R having a moveable portion 30 with a comparatively short length may be high and the resonance frequency of a resonator R having a moveable portion 30 with a comparatively long length may be low.

The sensing portion 20 may include a sensor layer for sensing movement of the moveable portion 30. The sensing portion 20 may include, for example, a piezoelectric element. In this case, the sensing portion 20 may have a structure in which an electrode layer, a piezoelectric material layer, and an electrode layer are sequentially layered. As a piezoelectric material, for example, zinc oxide (ZnO), tin oxide (SnO), lead zirconate titanate (PZT), zinc stannate ($ZnSnO_3$), polyvinylidene fluoride (PVDF), poly (vinylidene fluoride-trifluoroethylene) P(VDF-TrFE), aluminum nitride (AlN), lead magnesium niobate-lead titanate (PMN-PT), or the like may be used. As the electrode layer, any of various conductive materials, or metal, may be used.

The resonators R may have, for example, a width of several μms or less, a thickness of several μms or less, and a length of several mms or less. The resonators R, such a minute size, may be manufactured by a micro electro mechanical system (MEMS) process. Each resonator R may vibrate up and down in response to an external acoustic signal matching the resonance frequency of the respective resonator R. An amplitude at which the resonator R vibrates may be proportional to a pressure gradient of the acoustic signal received thereby. As such, since the resonators R vibrate up and down, the first resonator array 110 and the second resonator array 120 are bi-directional.

Figure 5:
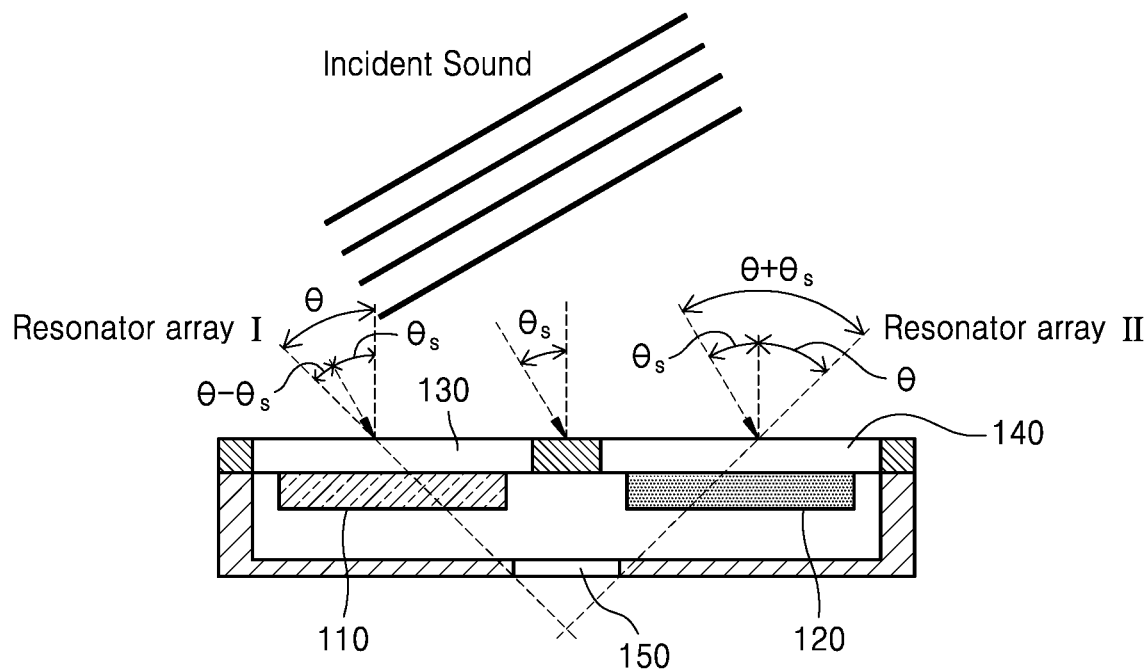
FIG. 5 is a schematic cross-sectional view showing an operating principle of the sound direction detection sensor shown in FIG. 1.

FIG. 5 is a schematic cross-sectional view showing an operating principle of the sound direction detection sensor 100 shown in FIG. 1. As described above, an acoustic path in a first direction is formed by the first sound inlet 130 and the sound outlet 150, and an acoustic path in a second direction is formed by the second sound inlet 140 and the sound outlet 150. The first resonator array (resonator array I) 110 has directivity along the first direction and the second resonator array (resonator array II) 120 has directivity along the second direction, such that they may have different directivities even if they are disposed in parallel with each other on the same plane.

Figure 6:
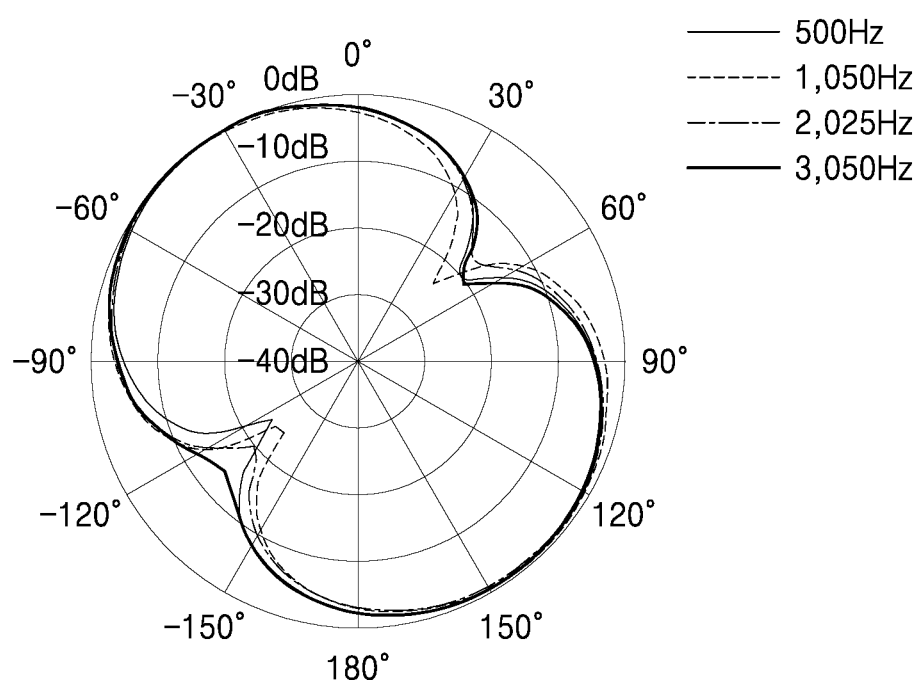
FIGS. 6 and 7 show a directivity of each resonator array of the sound direction detection sensor shown in FIG. 1.
Figure 7:
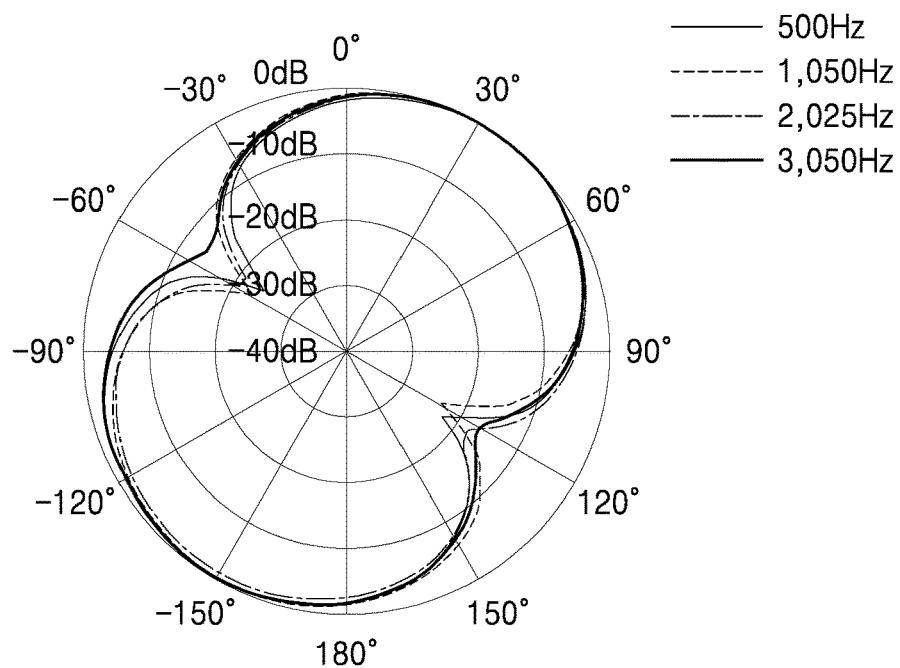

For example, as shown in FIG. 5, the sound outlet 150 is disposed in the lower substrate at a midway point between the first sound inlet 130 and the second sound inlet 140, such that the first direction and the second direction are each inclined by an angle θ with respect to a normal of the plane of the upper substrate. FIGS. 6 and 7 show the directivities of the first resonator array 110 and the second resonator array 120 of the sound direction detection sensor 100 in the exemplary embodiment illustrated in FIG. 5. In FIGS. 6 and 7, a direction normal to the plane of the upper substrate of the sound direction detection sensor 100 is defined as 0°, an outermost circle indicates 0 dB, and an innermost circle indicates −40 dB. As shown in FIG. 6, the first resonator array 110 has directivity inclined by θ with respect to the front in a counterclockwise direction. As shown in FIG. 7, the second resonator array 120 has directivity inclined by θ with respect to the front in a clockwise direction. That is, it can be seen that the first resonator array 110 and the second resonator array 120 have directivities inclined in different directions.

Thus, depending on a direction in which sound waves are incident on the sound direction detection sensor 100, an amplitude at which resonators of the first resonator array 110 vibrate and an amplitude at which resonators of the second resonator array 120 vibrate may change. For example, in FIG. 5, if sound waves are incident at an angle of $θ_s$ with respect to a line normal to the plane of the upper substrate direction of the sound direction detection sensor 100 from the left side of the sound direction detection sensor 100 (as shown in FIG. 5), the sound waves are incident on the first resonator array 110 at an angle of $θ-θ_s$ with respect to a unique directionality of the first resonator array 110 and are incident on the second resonator array 120 at an angle of $θ+θ_s$ with respect to a unique direction of the second resonator array 120. If a line normal to the plane of the upper substrate of the sound direction detection sensor 100 is defined as 0° and θ is 45°, then for $θ_s=0°$, amplitudes of vibration of the resonators of the first resonator array 110 and the second resonator array 120 may be the same as one another; for $-45°<θ_s<0°$, the amplitudes of vibration of the resonators of the first resonator array 110 are greater than the amplitudes of vibration of the resonators of the second resonator array 120; and for $0°<θ_s<45°$, the amplitudes of vibration of the resonators of the second resonator array 120 are greater than the amplitudes of vibration of the resonators of the first resonator array 110.

Figure 8:
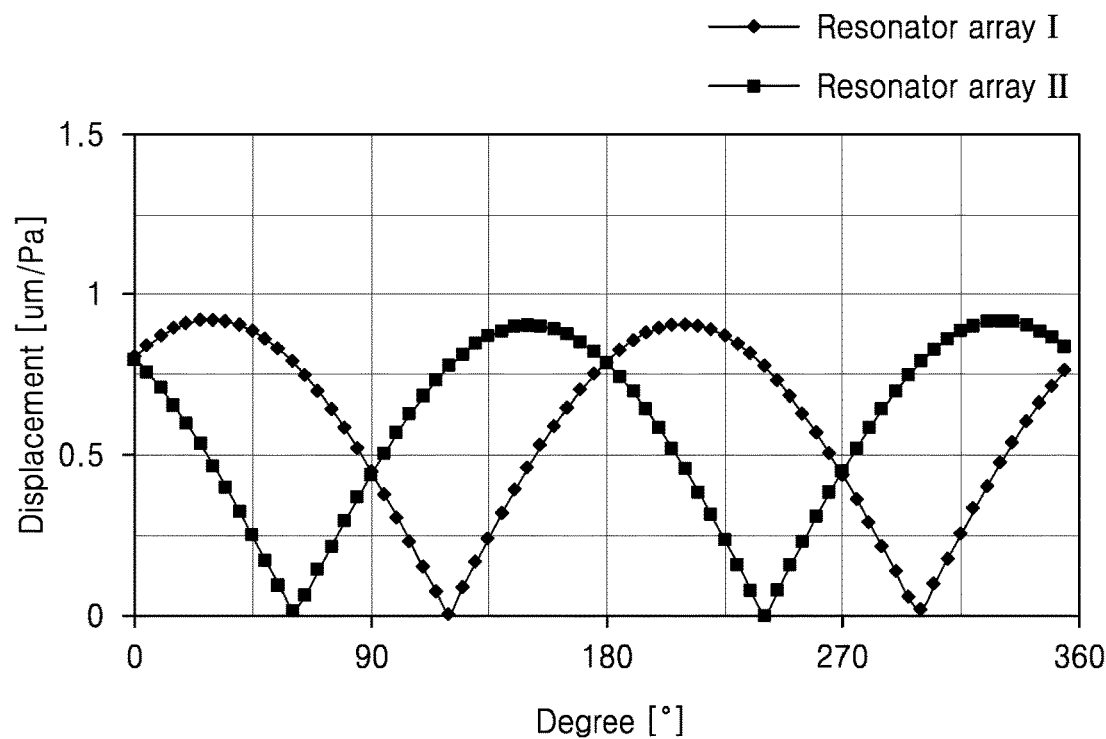
FIG. 8 is a graph showing a result of measuring directivity characteristics of two resonator arrays of the sound direction detection sensor shown in FIG. 1.

FIG. 8 is a graph showing a result of measuring the above-described directivity characteristics of the first resonator array 110 and the second resonator array 120 of the sound direction detection sensor 100. In FIG. 8, a horizontal axis indicates an angle at which sound waves are incident onto the sound direction detection sensor 100, with respect to a direction normal to the upper substrate of the sensor 100, and a vertical axis indicates amplitudes of vibration of the resonators of the first resonator array 110 and the second resonator array 120. The graph of FIG. 8 has been obtained by producing sound having a frequency of 1 kHz at angles between 0° and 360° with respect to the direction normal to the upper substrate of the sound direction detection sensor 100 and normalizing the average amplitudes of vibration of the resonators of the first resonator array 110 and the second resonator array 120. As shown in FIG. 8, the average amplitude of vibration of the resonators of the first resonator array 110 and the average amplitude of vibration of the resonators of the second resonator array 120 may vary with an angle at which sound waves are incident.

Figure 9:
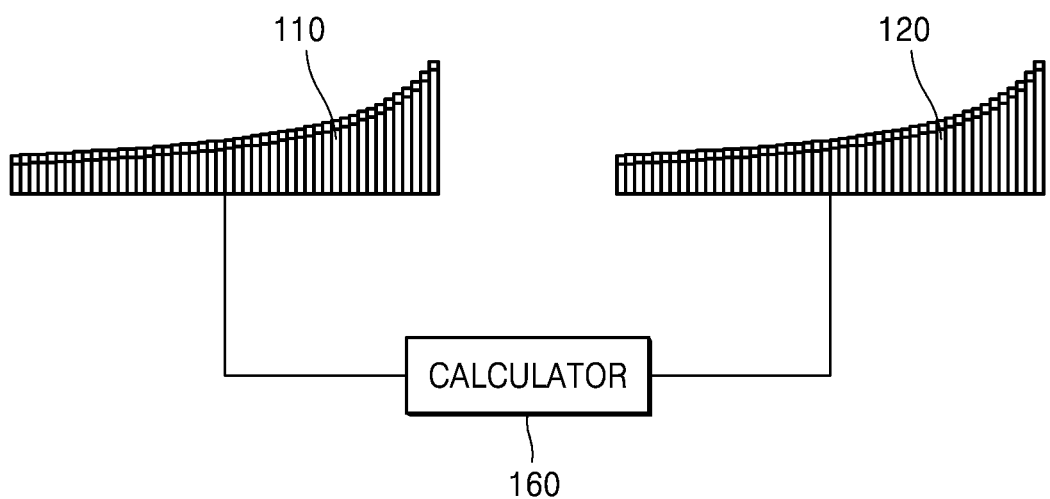
FIG. 9 is a block diagram of a calculator that calculates a direction of sound based on outputs of two resonator arrays, according to an exemplary embodiments.

Thus, by comparing the output of the first resonator array 110 with the output of the second resonator array 120, a direction in which sound waves are incident may be detected. FIG. 9 is a block diagram including a calculator that calculates a direction of sound based on the outputs of the first resonator array 110 and the second resonator array 120. Referring to FIG. 9, the sound direction detection sensor 100 may further include a calculator 160 that is connected with the first resonator array 110 and the second resonator array 120 and calculates a direction from which sound is incident based on the outputs received from the first resonator array 110 and the second resonator array 120. The calculator 160 compares the output of the first resonator array 110 with the output of the second resonator array 120 and calculates the direction of the sound based on a result of the comparison. An algorithm for determining the direction of the sound by comparing the output of the first resonator array 110 with the output of the second resonator array 120 may be implemented in any of various ways.

Figure 10:
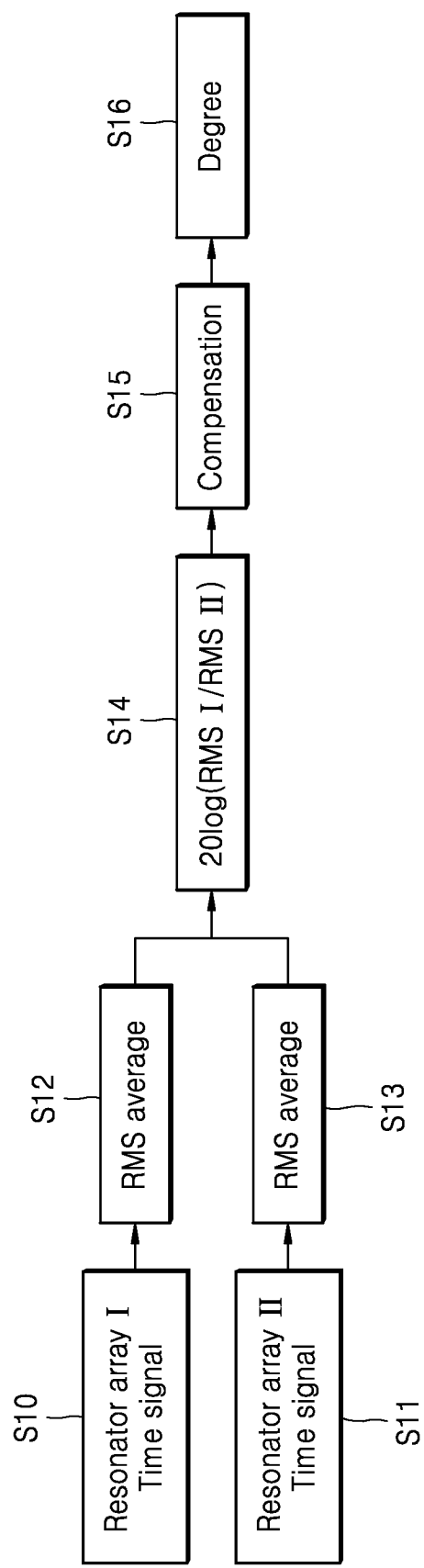
FIG. 10 is a flowchart of a process of calculating a direction from which sound is coming by using sound measured by two resonator arrays, according to an exemplary embodiment.

For example, FIG. 10 is a flowchart of an exemplary process of calculating a direction from which sound is incident by using sound measured by the first resonator array 110 and the second resonant array 120. In operation S10, the calculator 160 receives an output from the first resonator array 110 for a specific time. In operation S11, the calculator 160 also receives an output from the second resonator array 120 for the same specific time. The calculator 160 averages the output from the first resonator array 110 in operation S12. For example, the calculator 160 may calculate an average of a plurality of root-mean-squares (RMSs) of the plurality of resonators of the first resonator array 110 in a time domain. In the same manner, the calculator 160 calculates the average of RMSs of the plurality of resonators of the second resonator array 120 in the time domain. The calculator 160 divides the average output of the first resonator array 110 by the average output of the second resonator array 120 to compare the output of the first resonator array 110 with the output of the second resonator array 120, in operation S14.

A comparison value obtained in this way may vary based on the characteristics of the first resonator array 110 and of the second resonator array 120 in spite of the sound being incident on both resonator arrays from the same direction. Thus, the calculator 160 performs a compensation process of compensating for the comparison value obtained in operation S14 based on the characteristics of the first resonator array 110 and the second resonator array 120. For example, compensation parameters based on the directivities, arrangement directions, frequency response characteristics, etc., of the first resonator array 110 and of the second resonator array 120 may be stored in the calculator 160 in advance. The calculator 160 corrects the comparison value obtained in operation S14 by using the compensation parameters stored in advance. The calculator 160 calculates the direction of the sound by using the corrected comparison value obtained in operation S15. For example, data regarding a relationship between the corrected comparison value and the direction of the sound, expressed as an angle, may be stored in advance in the form of a lookup table. The calculator 160 then obtains the direction of the sound corresponding to the corrected comparison value by referring to the lookup table without performing a separate operation.

Operations S10 through S13 may be performed in any of various other ways. For example, the calculator 160 may obtain the average output of the first resonator array 110 based on an output of one or more of the plurality of resonators of the first resonator array 110, and obtain the average output of the second resonator array 120 based on an output of one or more of the plurality of resonators of the second resonator array 120. Herein, the one or more resonators of the first resonator array 110 may have the same resonance frequency (frequencies) as the one or more resonators of the second resonator array 120. In operations S12 and S13 of calculating the average outputs, the calculator 160 may compare time domain data induced from the output of the selected one or more resonators of the first resonator array 110 with time domain data induced from the output of the one or more resonators of the second resonator array 120. In other words, the calculator 160 calculates an RMS of the selected one or more resonators for the time domain to obtain the comparison value between the first resonator array 110 and the second resonator array 120.

Instead, the calculator 160 may compare frequency domain data induced from the output of the one or more selected resonators of the first resonator array 110 with frequency domain data induced from the output of the one or more selected resonators of the second resonator array 120. In other words, the calculator 160 may calculate an RMS of the selected one or more resonators for the frequency domain to obtain the comparison value between the first resonator array 110 and the second resonator array 120. When the calculator 160 calculates the comparison value based on the frequency domain, the calculator 160 does not need to receive outputs from the first resonator array 110 and the second resonator array 120 for a specific time and may use only a spectrum of the sound received from the first resonator array 110 and a spectrum of the sound received from the second resonator array 120.

Figure 11:
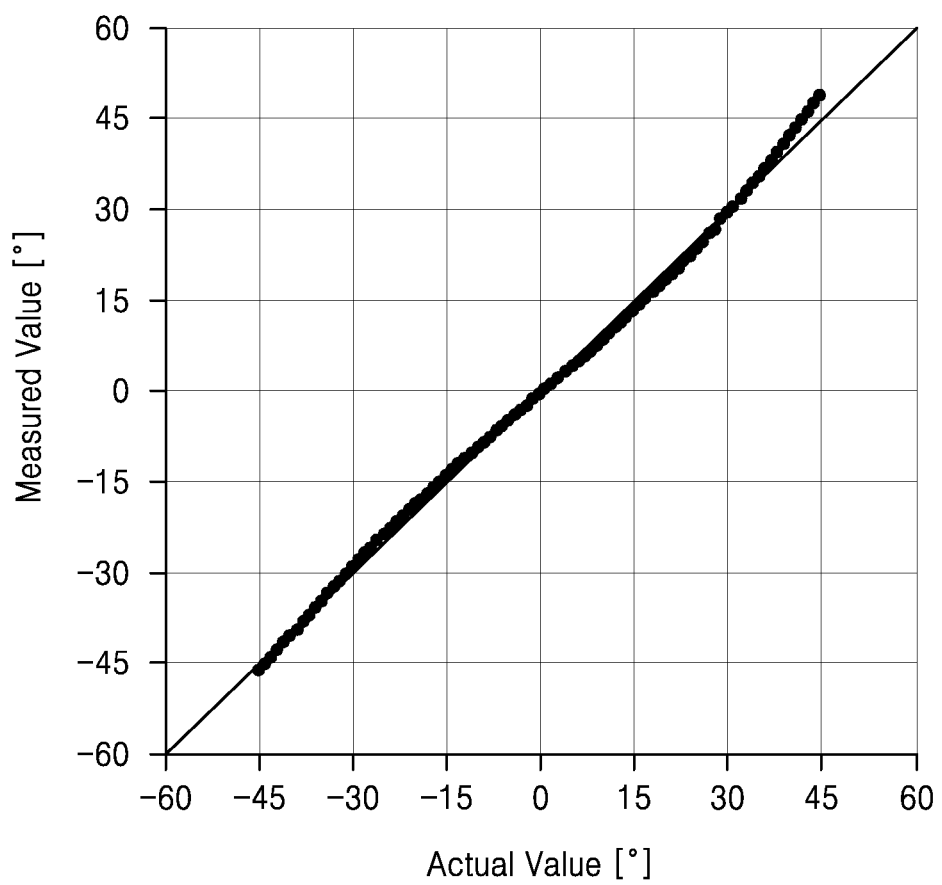
FIG. 11 is a graph showing a comparison between a measured sound direction and an actual sound direction, according to an exemplary embodiment.

FIG. 11 is a graph showing a comparison between a sound direction measured as described above and an actual sound direction. In FIG. 11, a horizontal axis indicates an angle of an actual sound direction and a vertical axis indicates an angle of a measured sound direction. Referring to FIG. 11, since the actual sound direction and the measured sound direction have a substantially linear relationship, the sound direction detection sensor 100 according to the current exemplary embodiment may detect the direction of the sound with a relatively high accuracy.

The sound direction detection sensor 100 detects the direction of sound by using the first resonator array 110 and the second resonator array 120 whose directivities are different from each other, thus avoiding a restriction on the distance between the first resonator array 110 and the second resonator array 120. As a result, in spite of a short distance between the first resonator array 110 and the second resonator array 120, the direction of sound may be detected with a comparatively superior angular resolution. Therefore, the sound direction detection sensor 100 according to the current exemplary embodiment may be miniaturized and may be mounted on a small-size electronic product. Moreover, the sound direction detection sensor 100 according to the current exemplary embodiment may continuously measure the direction of sound over time.

Figure 12:
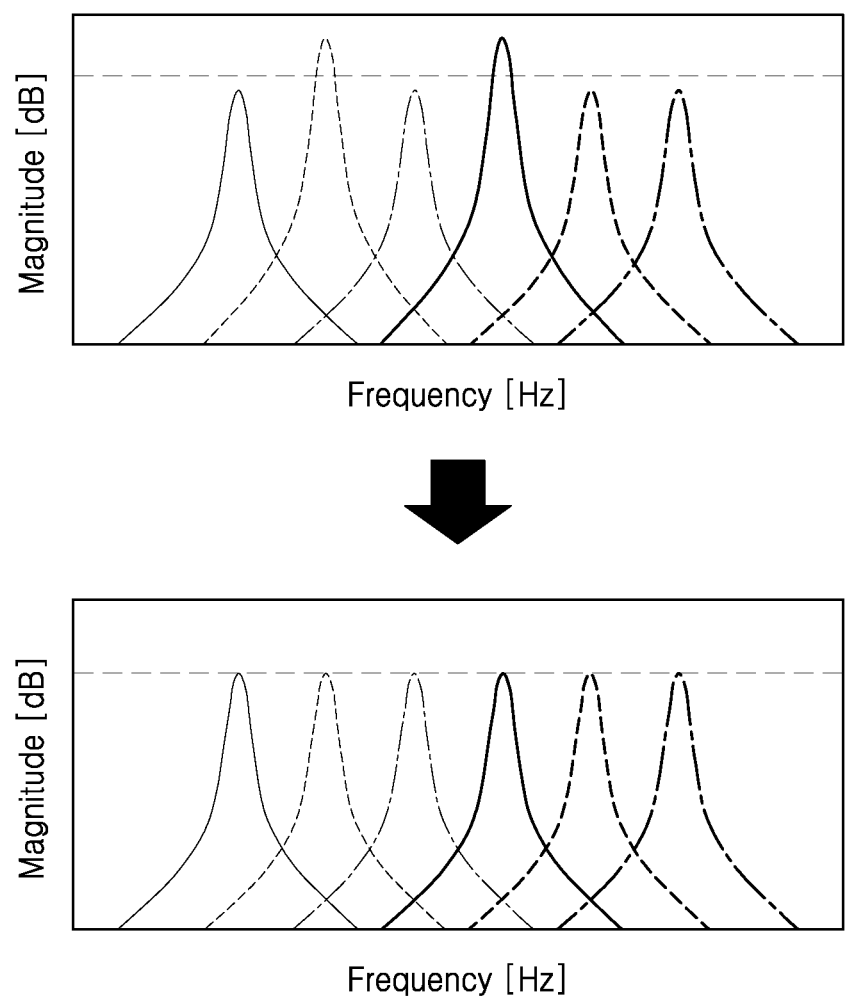
FIG. 12 shows an averaging of an output of a first resonator array in a frequency domain in a noisy environment, according to an exemplary embodiment.
Figure 13:
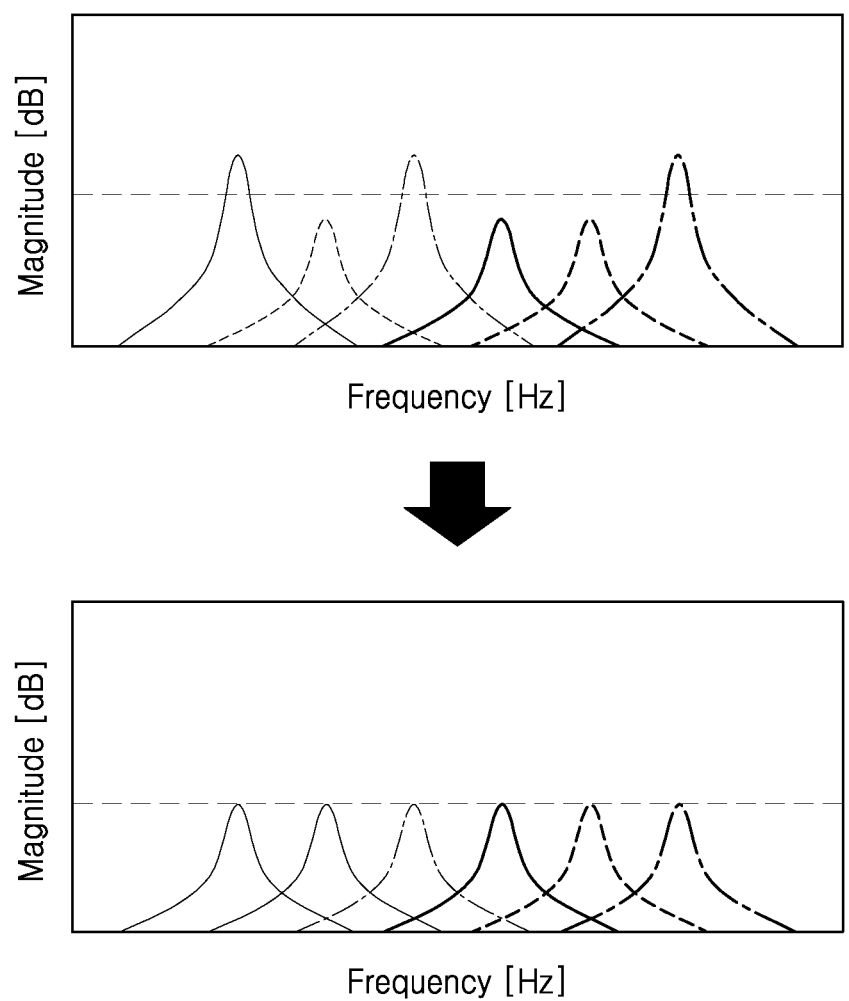
FIG. 13 shows an averaging of output of a second resonator array in a frequency domain in a noisy environment, according to an exemplary embodiment.

Since the sound direction detection sensor 100 uses a plurality of resonators having different resonance frequencies, the sound direction detection sensor 100 is capable of performing a broadband measurement and accurately detecting the direction of sound even in a noisy environment, and the sound direction detection sensor 100 may also restore sound because the sound direction detection sensor 100 has frequency band information. FIG. 12 shows an averaging of the output of the first resonator array 110 in the frequency domain in a noisy environment, and FIG. 13 shows an averaging of the output of the second resonator array 120 in the frequency domain in the noisy environment. As shown in FIGS. 12 and 13, outputs of the first resonator array 110 and the second resonator array 120 are averaged on in frequency domain and the averaged outputs of the first resonator array 110 and the second resonator array 120 may be compared with each other, such that the influence of noise in a particular frequency band, such as the noise of a vehicle, may be reduced. Thus, in an environment having noise in the frequency band, the sound direction detection sensor 100 maintains robust characteristics.

Since the sound direction detection sensor 100 analyzes a spectrum of incident sound by using a plurality of resonators, the sound direction detection sensor 100 may remove a particular frequency region in which noise is substantially continuous, and may also average the outputs of the first resonator array 110 and the second resonator array 120. Thus, the sound direction detection sensor 100 may remove a noise component when averaging the outputs of the first resonator array 110 and the second resonator array 120, further improving the accuracy of a measurement. A particular frequency component may be selected from incident sound and the direction of sound having the frequency component may be selectively detected. Also, the directions of sounds of several different frequency components may be detected at the same time. In this way, by simultaneously detecting the directions of sounds of a plurality of frequency components, stereoscopic audio information may be obtained.

Figure 14:
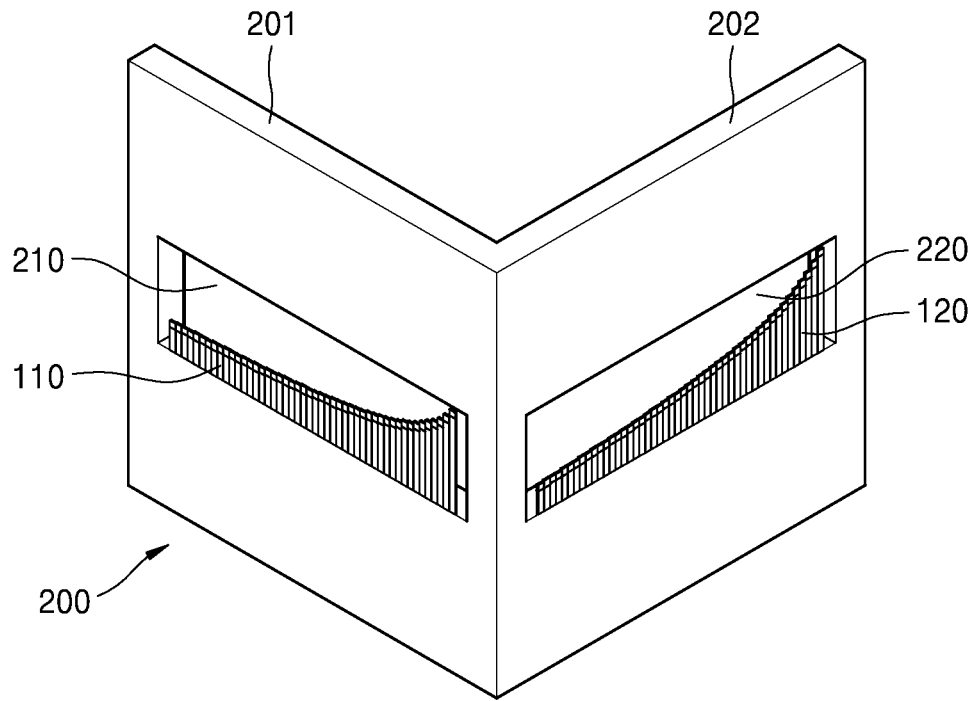
FIG. 14 is a schematic perspective view showing a structure of a sound direction detection sensor according to another exemplary embodiment.

FIG. 14 is a schematic perspective view showing a structure of a sound direction detection sensor according to another exemplary embodiment. Referring to FIG. 14, a sound direction detection sensor 200 according to an exemplary embodiment may include a first substrate 201 and a second substrate 202 that are inclined with respect to each other, a first sound inlet 210 formed as an opening through the first substrate 201, a second sound inlet 220 formed as an opening through the second substrate 202, the first resonator array 110 fixed on the first substrate 201 to face the first sound inlet 210, and the second resonator array 120 fixed on the second substrate 202 to face the second sound inlet 220.

In FIG. 14, the first substrate 201 and the second substrate 202 are illustrated as being connected to each other. For example, the first substrate 201 and the second substrate 202 may be connected in such a way that a side of the first substrate 201 and a side of the second substrate 202 contact each other. In this case, the first substrate 201 and the second substrate 202 may be integrally formed. However, alternately, the first substrate 201 and the second substrate 202 may be spaced apart from each other, and in this case, the first substrate 201 and the second substrate 202 may be manufactured separately. To give different directivities to the first resonator array 110 and the second resonator array 120, the first substrate 201 and the second substrate 202 may be inclined with respect to each other. Thus, the first resonator array 110 and the second resonator array 120 are directed in different directions and have different directivities. For example, an internal angle between the first substrate 201 and the second substrate 202 may be about 90 degrees. In this case, the first resonator array 110 and the second resonator array 120 may have a directivity difference of 90 degrees therebetween.

The first resonator array 110 and the second resonator array 120 may have the same structures as described above. For example, the first resonator array 110 and the second resonator array 120 may each include a plurality of resonators having different resonance frequencies. Each of the resonators of the first resonator array 110 and of the second resonator array 120 may include a fixed portion 10, a moveable portion 30, a sensing portion 20, and a mass body 40, as shown in FIG. 4. The fixed portion 10 of each resonator of the first resonator array 110 is fixed on the first substrate 201, and the fixed portion 10 of each resonator of the second resonator array 120 is fixed on the second substrate 202. The fixed portions 10 of the plurality of resonators of the first resonator array 110 may be arranged along a side of the first sound inlet 210, without overlapping with one another, and the fixed portions 10 of the plurality of resonators of the second resonator array 120 may be arranged along a side of the second sound inlet 220, without overlapping with one another. The moveable portions 30 of the plurality of resonators of the first resonator array 110 may be exposed to incident sound waves through the first sound inlet 210, and the moveable portions 30 of the plurality of resonators of the second resonator array 120 may be exposed to incident sound waves through the second sound inlet 220. The moveable portions 30 of the first resonator array 110 and of the second resonator array 120 vibrate in response to sound passing through the first sound inlet 210 and the second sound inlet 220, respectively.

Figure 15:
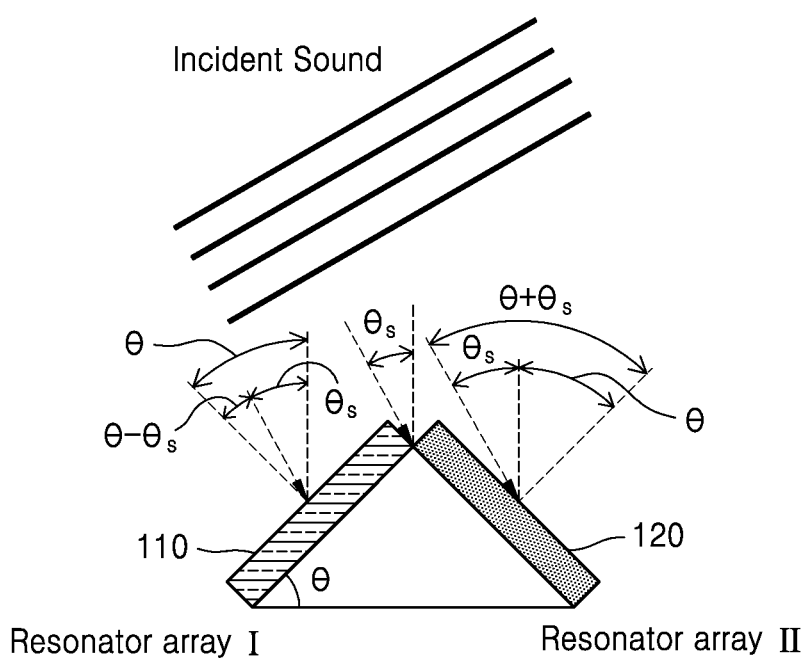
FIG. 15 is a schematic cross-sectional view showing an operating principle of the sound direction detection sensor shown in FIG. 14.

FIG. 15 is a schematic cross-sectional view showing an operating principle of the sound direction detection sensor 200 shown in FIG. 14. As described above, the first resonator array 110 and the second resonator array 120 are disposed in different directions and thus have different directivities. For example, as shown in FIG. 15, assuming that an edge, along which the first substrate 201 and the second substrate 202 are in contact with each other, is disposed toward the front and an angle between the first substrate 201 and a horizontal plane and an angle between the second substrate 202 and the horizontal plane are θ (the first substrate 201, the second substrate 202, and the horizontal plane forming a triangle, such that 180°=2θ+the angle between the first and second substrates), then a line normal to the first resonator array 110 has directivity inclined by θ in the counterclockwise direction with respect to the front and a line normal to the second resonator array 120 has directivity inclined by θ in the clockwise direction with respect to the front.

Thus, depending on a of incident sound incident onto the sound direction detection sensor 200, the amplitudes at which resonators of the first resonator array 110 vibrate and the amplitudes at which resonators of the second resonator array 120 vibrate may vary. For example, in FIG. 15, if sound is incident onto the sensor 200, from the left side at an inclination of $θ_s$ with respect to the front direction of the sound direction detection sensor 200, the sound is incident onto the first resonator array 110 at an angle of $θ-θ_s$ with respect to a line normal to the first substrate and onto the second resonator array 120 at an angle of $θ+θ_s$ with respect to a line normal to the second substrate. If the front direction of the sound direction detection sensor 200 is defined as 0° and θ is 45°, the first resonator array 110 has a directivity difference with respect to the second resonator 120 of 90°. For $\theta_s=0°$, amplitudes of vibration of the resonators of the first resonator array 110 may be the same as amplitudes of vibration of the resonators of the second resonator array 120; for $-45°<\theta_s<0°$, the amplitudes of vibration of the resonators of the first resonator array 110 may be greater than amplitudes of vibration of the resonators of the second resonator array 120; and for $0°<\theta_s<45°$, the amplitude of vibration of the resonators of the second resonator array 120 may be greater than amplitudes of vibration of the resonators of the first resonator array 110.

Figure 16:
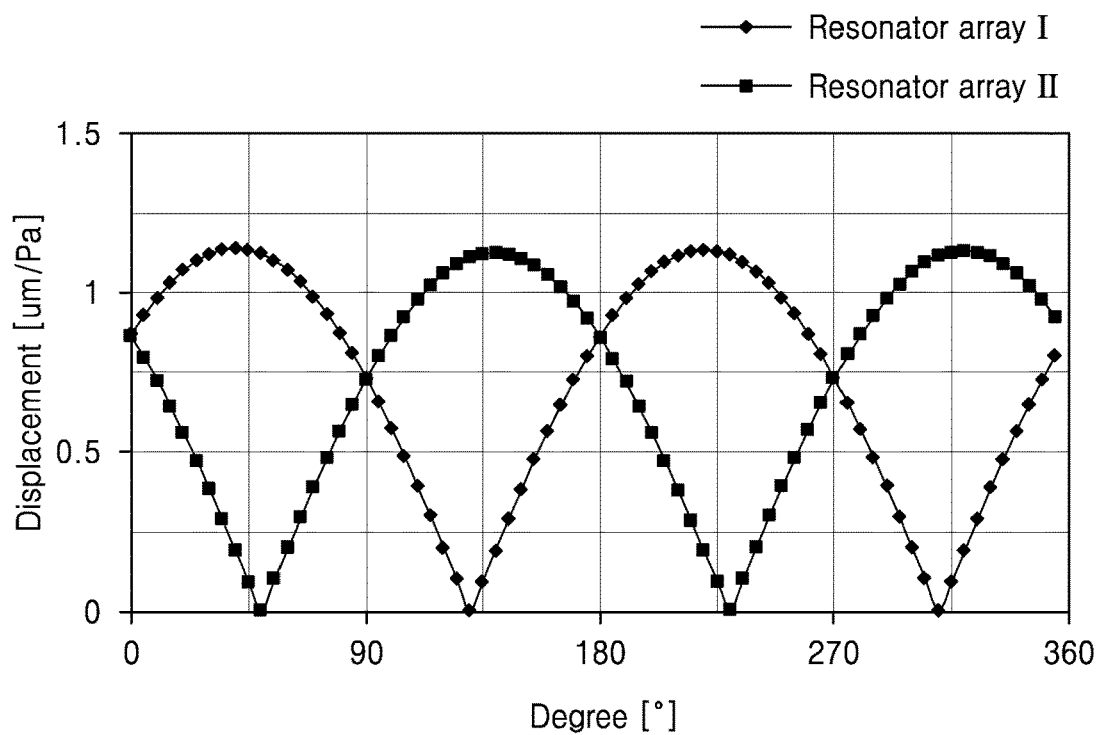
FIG. 16 is a graph showing a result of measuring directivity characteristics of each resonator array of the sound direction detection sensor shown in FIG. 14.

FIG. 16 is a graph showing a result of measuring the above-described directivity characteristics of the first resonator array 110 and the second resonator array 120 of the sound direction detection sensor 200. In FIG. 16, a horizontal axis indicates an angle at which sound is incident to the sound direction detection sensor 200, with respect to the front direction, and a vertical axis indicates amplitudes of vibration of the resonators of the first resonator array 110 and of the second resonator array 120. The graph of FIG. 16 has been obtained by producing sound having a frequency of 1 kHz at an angle of 0 degree to 360 degrees with respect to the sound direction detection sensor 200 and normalizing the average amplitudes of vibration of the resonators of the first resonator array 110 and of the second resonator array 120. As shown in FIG. 16, the average amplitude of vibration of the resonators of the first resonator array 110 and the average amplitude of vibration of the resonators of the second resonator array 120 may vary with an angle at which sound is incident. When the direction of the incident sound approaches 0°, 90°, 180°, and 270°, the average amplitudes of vibration of the first resonator array 110 and of the second resonator array 120 are the same as each other. Thus, by comparing the output of the first resonator array 110 with the output of the second resonator array 120, a direction in which sound is incident may be detected.

Figure 17:
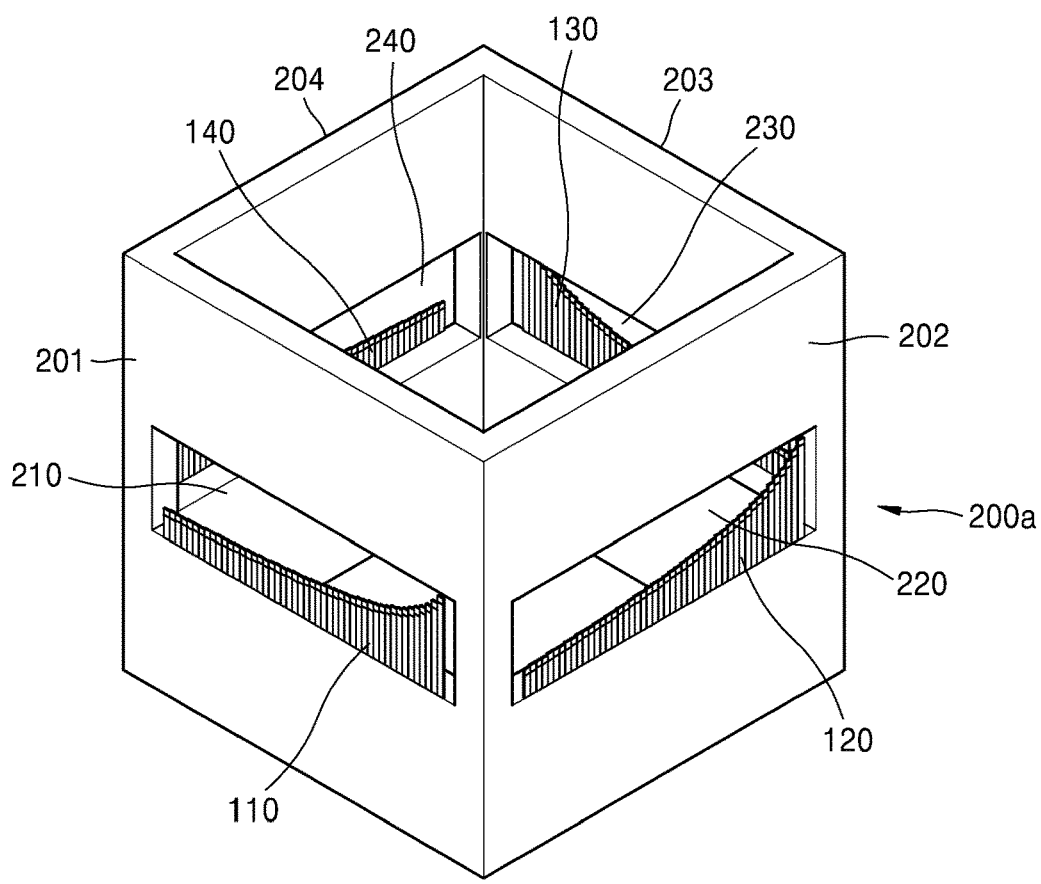
FIGS. 17, 18, and 19 are schematic perspective views showing a structure of a sound direction detection sensor according to other exemplary embodiments.
Figure 18:
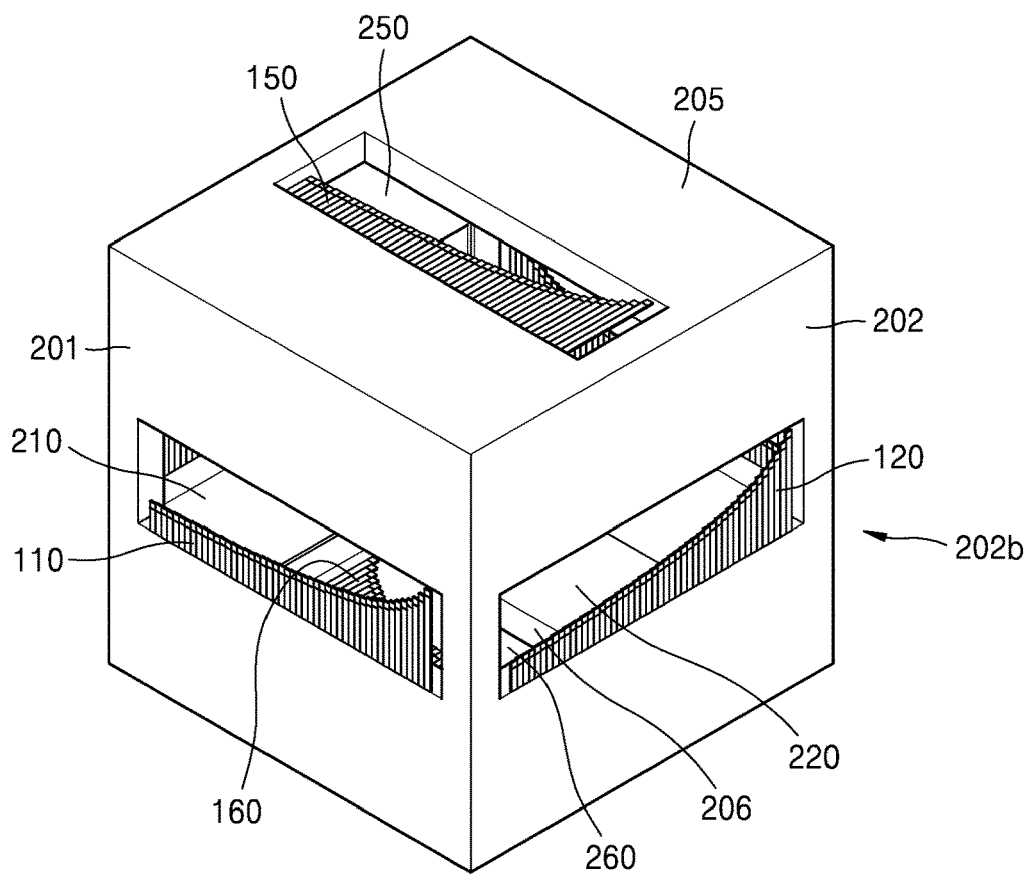
Figure 19:
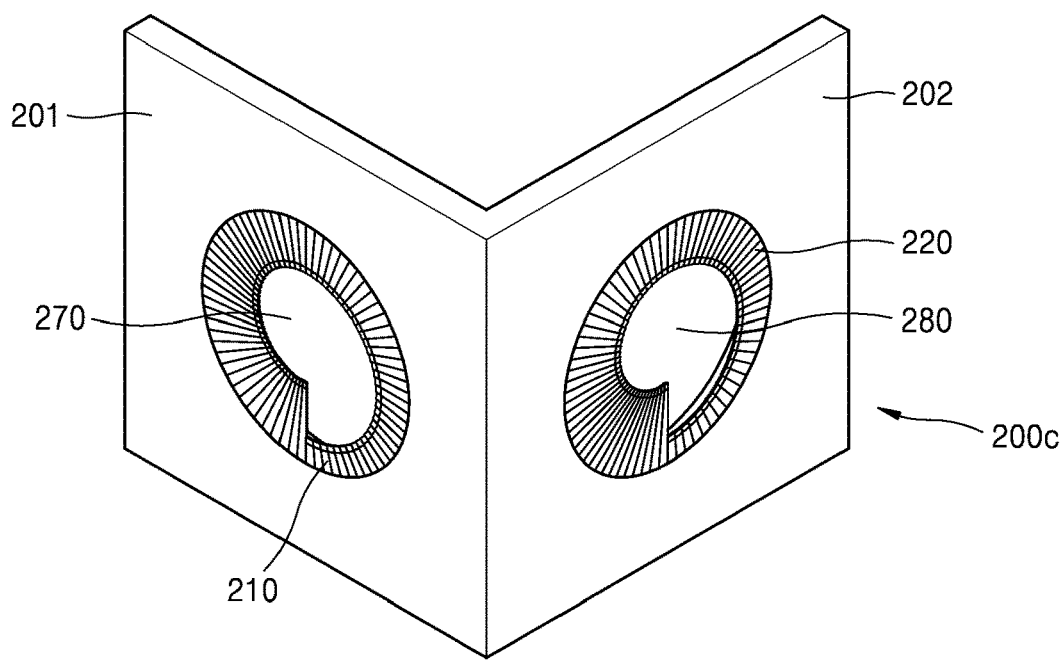

Although the sound direction detection sensor 200 shown in FIG. 14 is illustrated as including only two resonator arrays 110 and 120, the present disclosure is not limited thereto. FIGS. 17 through 19 are schematic perspective views showing a structure of a sound direction detection sensor according to various other exemplary embodiments.

Referring to FIG. 17, a sound direction detection sensor 200a according to an exemplary embodiment may include the first substrate 201 having the first sound inlet 210, the second substrate 202 having the second sound inlet 220, a third substrate 203 having a third sound inlet 230, and a fourth substrate 204 having a fourth sound inlet 240. The first resonator array 110 is fixed on the first substrate 201 to face the first sound inlet 210; the second resonator array 120 is fixed on the second substrate 202 to face the second sound inlet 220; a third resonator array 130 is fixed on the third substrate 203 to face the third sound inlet 230; and a fourth resonator array 140 is fixed on the fourth substrate 204 to face the fourth sound inlet 240. For example, the first substrate 201, the second substrate 202, the third substrate 203, and the fourth substrate 204 may be disposed to form a square or rectangular tube. Thus, the first through fourth resonator arrays 110 through 140 may have four different directivities with respect to a horizontal plane.

Referring to FIG. 18, in addition to components of the sound direction detection sensor 200a shown in FIG. 17, a sound direction detection sensor 200b according to an exemplary embodiment may further include a fifth substrate 205 having a fifth sound inlet 250, a sixth substrate 206 having a sixth sound inlet 260, a fifth resonator array 150 fixed on the fifth substrate 205 to face the fifth sound inlet 250, and a sixth resonator array 160 fixed on the sixth substrate 206 to face the sixth sound inlet 260. For example, the fifth substrate 205 and the sixth substrate 206 may be disposed to face each other and may each be perpendicular to each the first through fourth substrates 201 through 204. Thus, the first through sixth substrates 201 through 206 may form a hexahedron or rectangular parallelepiped. Thus, the first through sixth resonator arrays 110 through 160 may have six different directivities.

Referring to FIG. 19, a sound direction detection sensor 200c according to an exemplary embodiment may include a first substrate 201 having a circular first sound inlet 270, a second substrate 202 having a circular second sound inlet 280, a first resonator array 210 fixed on the fifth substrate 201 to face the first sound inlet 270, and a second resonator array 220 fixed on the second substrate 202 to face the second sound inlet 280. In the above-described exemplary embodiments, all of the sound inlets 130, 140, 210, 220, 230, 240, 250, and 260 have rectangular forms, but as shown in FIG. 19, circular sound inlets 270 and 280 may also be used. In addition, in the preceding exemplary embodiments, the resonators of each of the resonator arrays 110, 120, 130, 140, 150, and 160 are arranged in a line along a side of the sound inlets 130, 140, 210, 220, 230, 240, 250, and 260, respectively, but as shown in FIG. 19, the plurality of resonators of each of the first resonator array 210 and the second resonator array 220 may be arranged along a circumference of the first sound inlet 270 and the second sound inlet 280, respectively.

Although sound direction detection sensors including multi-resonator arrays have been described with reference to the exemplary embodiments shown in the drawings, the sound direction detection sensor may also be replaced with a resonance structure having one resonator as mentioned above. While the foregoing embodiments have been shown and described as examples, it will be apparent to those of ordinary skill in the art that modifications and variations can be made without departing from the spirit and scope defined by the appended claims. Therefore, the disclosed exemplary embodiments should be considered in an illustrative sense rather than a restrictive sense. The scope of the exemplary embodiments will be in the appended claims, and all of the differences in the equivalent range thereof should be understood to be included in the exemplary embodiments.

It should be understood that exemplary embodiments described herein should be considered in a descriptive sense only and not for purposes of limitation. Descriptions of features or aspects within each exemplary embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A sound direction detection sensor comprising:
   a first resonator array comprising a first plurality of resonators; and
   a second resonator array comprising a second plurality of resonators,
   wherein a directivity of the first resonator array is different from a directivity of the second resonator array,
   wherein frequency response characteristics of the first resonator array are the same as frequency response characteristics of the second resonator array.

2. The sound direction detection sensor of claim 1, wherein resonance frequencies of the first plurality of resonators and resonance frequencies of the second plurality of resonators are within an audible frequency band.

3. The sound direction detection sensor of claim 1, wherein the directivity of the first resonator array forms an angle of 90 degrees with the directivity of the second resonator array.

4. The sound direction detection sensor of claim 1, further comprising a calculator configured to calculate a direction of sound based on an output of the first resonator array and an output of the second resonator array.

5. The sound direction detection sensor of claim 4, wherein the calculator is further configured to detect the direction of sound by comparing the output of the first resonator array with the output of the second resonator array.

6. A sound direction detection sensor comprising:
a first resonator array comprising a first plurality of resonators;
a second resonator array comprising a second plurality of resonators; and
a calculator configured to calculate a direction of sound based on an output of the first resonator array and an output of the second resonator array,
wherein a directivity of the first resonator array is different from a directivity of the second resonator array,
wherein the calculator is further configured to detect the direction of sound by comparing the output of the first resonator array with the output of the second resonator array, and
wherein the calculator is further configured to calculate the output of the first resonator array by calculating an average of root-mean-squares of the first plurality of resonators in a time domain and to calculate the output of the second resonator array by calculating an average of root-mean-squares of the second plurality of resonators in the time domain.

7. The sound direction detection sensor of claim 4, wherein the calculator is further configured to detect the direction of sound by comparing an output of at least one resonator of the first plurality of resonators with an output of at least one resonator of the second plurality of resonators.

8. A sound direction detection sensor comprising:
a first resonator array comprising a first plurality of resonators;
a second resonator array comprising a second plurality of resonators; and
a calculator configured to calculate a direction of sound based on an output of the first resonator array and an output of the second resonator array,
wherein a directivity of the first resonator array is different from a directivity of the second resonator array, and
wherein the calculator is further configured to detect the direction of sound by comparing one of time domain data and frequency domain data derived from an output of at least one resonator of the first plurality of resonators and an output of at least one resonator of the second plurality of resonators.

9. A sound direction detection sensor comprising:
a first resonator array comprising a first plurality of resonators;
a second resonator array comprising a second plurality of resonators;
a first substrate and a second substrate which is inclined with respect to the first substrate;
a first sound inlet comprising an opening through the first substrate; and
a second sound inlet comprising an opening through the second substrate,
wherein a directivity of the first resonator array is different from a directivity of the second resonator array.

10. The sound direction detection sensor of claim 9, wherein the first resonator array is fixed on the first substrate and is facing the first sound inlet, and the second resonator array is fixed on the second substrate and is facing the second sound inlet.

11. The sound direction detection sensor of claim 10, wherein each of the first plurality of resonators comprises a fixed portion fixed on the first substrate, a moveable portion configured to move in response to an audio signal, and a sensing portion configured to sense movement of the moveable portion, and
each of the second plurality of resonators comprises a fixed portion fixed on the second substrate, a moveable portion configured to move in response to an audio signal, and a sensing portion configured to sense movement of the moveable portion.

12. The sound direction detection sensor of claim 11, wherein the moveable portions of the first plurality of resonators of the first resonator array are exposed to incident sound through the first sound inlet, and the moveable portions of the plurality of second resonators of the second resonator array are exposed to incident sound through the second sound inlet.

13. The sound direction detection sensor of claim 12, wherein the fixed portions of the first plurality of resonators are disposed along a side of the first sound inlet and do not overlap one another, and the fixed portions of the second plurality of resonators are disposed along a side of the second sound inlet and do not overlap one another.

14. The sound direction detection sensor of claim 9, wherein a side of the first substrate is connected to a side of the second substrate, and an angle between the first substrate and the second substrate is 90 degrees.

15. The sound direction detection sensor of claim 9, further comprising:
a third substrate and a third sound inlet comprising an opening through the third substrate;
a fourth substrate an a fourth sound inlet comprising an opening through the fourth substrate;
a third resonator array fixed on the third substrate and facing the third sound inlet; and
a fourth resonator array fixed on the fourth substrate and facing the fourth sound inlet,
wherein the first substrate, the second substrate, the third substrate, and the fourth substrate are arranged to form a square.

16. The sound direction detection sensor of claim 9, further comprising:
a third substrate and a third sound inlet comprising an opening through the third substrate;
a fourth substrate and a fourth sound inlet comprising an opening through the fourth substrate;
a fifth substrate and a fifth sound inlet comprising an opening through the fifth substrate;
a sixth substrate and a sixth sound inlet comprising an opening through the sixth substrate;
a third resonator array fixed on the third substrate and facing the third sound inlet;
a fourth resonator array fixed on the fourth substrate and facing the fourth sound inlet;
a fifth resonator array fixed on the fifth substrate and facing the fifth sound inlet; and a sixth resonator array fixed on the sixth substrate and facing the sixth sound inlet,
wherein the first substrate, the second substrate, the third substrate, the fourth substrate, the fifth substrate, and the sixth substrate are arranged to form a hexahedron.

17. A sound direction detection sensor comprising:
a first substrate;
a first sound inlet comprising a first opening through the first substrate and a second sound inlet comprising a second opening through the first substrate;
a second substrate spaced apart from the first substrate;
a sound outlet comprising an opening through the second substrate;
a first resonator fixed on the first substrate and facing the first sound inlet; and
a second resonator fixed on the first substrate and facing the second sound inlet.

18. The sound direction detection sensor of claim 17, wherein the first substrate is substantially parallel to the second substrate, and
the sound direction detection sensor further comprises a spacer disposed between an edge of the first substrate and an edge of the second substrate.

19. The sound direction detection sensor of claim 17, wherein the first sound inlet is spaced apart from the second sound inlet, the first sound inlet and the sound outlet form an acoustic path in a first direction, and the second sound inlet and the sound outlet form an acoustic path in a second direction, different from the first direction.

20. The sound direction detection sensor of claim 17, wherein the first resonator is substantially parallel to the second resonator.

21. The sound direction detection sensor of claim 17, wherein the first resonator comprises a first plurality of resonators, and the second resonator comprises a second plurality of resonators.

22. The sound direction detection sensor of claim 21, wherein each of the first plurality of resonators and the second plurality of resonators comprises:
a fixed portion fixed on the first substrate;
a moveable portion configured to move in response to an audio signal; and
a sensing portion configured to sense movement of the moveable portion.

23. The sound direction detection sensor of claim 22, wherein the moveable portions of the first plurality of resonators are exposed to incident sound through the first sound inlet, and the moveable portions of the second plurality of resonators are exposed to incident sound through the second sound inlet.

24. The sound direction detection sensor of claim 22, wherein the fixed portions of the first plurality of resonators of the first resonator are disposed along a side of the first sound inlet and do not overlap one another, and the fixed portions of the second plurality of resonators are disposed along a side of the second sound inlet and do not overlap one another.

* * * * *